United States Patent [19]

Moore, Jr. et al.

[11] Patent Number: 5,003,379

[45] Date of Patent: Mar. 26, 1991

[54] TELECINE SCANNING APPARATUS WITH SPECTRALLY-SHIFTED SENSITIVITIES RESPONSIVE TO NEGATIVE OR PRINT FILM DYES

[75] Inventors: Leslie G. Moore, Jr., Webster; Anna L. Hrycin; Andrew F. Kurtz, both of Rochester, all of N.Y.

[73] Assignee: Eastman Kodak Company, Rochester, N.Y.

[21] Appl. No.: 422,328

[22] Filed: Oct. 16, 1989

[51] Int. Cl.$^5$ .............................................. H04N 9/11
[52] U.S. Cl. ....................................... 358/54; 358/76
[58] Field of Search ..................... 358/54, 75, 76, 80, 358/214; 355/38, 35, 32, 71

[56] References Cited

U.S. PATENT DOCUMENTS

| | | |
|---|---|---|
| 3,944,739 | 3/1976 | Sword et al. . |
| 4,009,489 | 2/1977 | Seer, Jr. ............................... 358/54 |
| 4,013,355 | 3/1977 | Mailloux ............................... 355/71 |
| 4,093,375 | 6/1978 | Griesch et al. . |
| 4,189,227 | 2/1980 | Barbieri . |
| 4,264,193 | 4/1981 | Oonishi ................................ 355/32 |
| 4,326,217 | 4/1982 | Iwasawa et al. ..................... 358/214 |
| 4,359,280 | 11/1982 | Krause . |
| 4,403,854 | 9/1983 | von Stein et al. .................... 355/38 |
| 4,422,752 | 12/1983 | Thurm et al. ......................... 355/32 |
| 4,505,569 | 3/1985 | Seto et al. . |
| 4,589,766 | 5/1986 | Fürsich et al. . |
| 4,603,964 | 8/1986 | Terashita . |
| 4,610,538 | 9/1986 | Takenaka . |
| 4,707,118 | 11/1987 | Terashita . |
| 4,823,186 | 4/1989 | Muramatsu .......................... 358/43 |
| 4,833,532 | 5/1989 | Abe ...................................... 358/80 |
| 4,841,362 | 6/1989 | Urabe et al. ......................... 358/80 |
| 4,868,383 | 9/1989 | Kurtz ................................... 250/228 |

FOREIGN PATENT DOCUMENTS 0103224  5/1988  Japan ..................................... 355/71

OTHER PUBLICATIONS

"Color Bars on Film for Setting Up Telecines", by R. W. G. Hunt, SMPTE Journal, 2/78, vol. 87, pp. 78-81, line 6, p. 3.
Ser. No. 373,309, filed 6/29/89, "Method and Apparatus for Generating a High Definition Electronic Signal from a Line Scan of a Color Original", in spec. p. 13, line 27.
Ser. No. 406,407, filed 9/12/89, "Motion Picture Telecine Balanced for Negative Scanning", in spec. p. 9, line 13.

Primary Examiner—Howard W. Britton
Attorney, Agent, or Firm—David M. Woods

[57] ABSTRACT

A telecine scanner is selectively conformed to evaluate the dye densities characteristic of either negative or print film. The film is interposed in a light path between a light source and a pickup stage that develops a plurality of color output signals from the light passing through the film. Color channel filters included in the pickup stage have spectral passbands in the respective colors that are broad enough to include the spectral dye densities of both negative and print materials. The scanner sensitivity is further limited to a particular film material by inserting an appropriate shaping filter set into the light path, preferably between the light source and the film, for conforming the peak sensitivity of at least one of the passbands to the peak spectral density of the corresponding dye of the particular film material.

14 Claims, 9 Drawing Sheets

TELECINE SCANNING APPARATUS WITH SPECTRALLY-SHIFTED SENSITIVITIES RESPONSIVE TO NEGATIVE OR PRINT FILM DYES

BACKGROUND OF THE INVENTION

1. Field of the Invention

This invention pertains to the conversion of picture information on a motion picture film into a video signal and, more particularly, to a film scanning apparatus commonly known as a telecine scanner, which is used for playback of a motion picture film for television production and programming.

2. Background Art

In a motion picture, the original scene is exposed upon negative photographic film, producing three interrelated dye records of the original scene. Cyan, magenta, and yellow dyes are typically used in a color negative film, and their amounts correspond respectively to the red, green, and blue information in the scene. Each dye absorbs light preferentially in a different region of the spectrum with peak absorption in the desired red, green, or blue regions. Typical yellow, magenta, and cyan dyes preferentially absorb bands of the spectrum from about 380 to 490 nm ("blue" light), 490 to 580 nm ("green" light), and 580 to 740 nm ("red" light), respectively. The spectral densities associated with such absorptions are designed for compatibility with the duplication and editing steps normally used in a motion picture film production. Through a series of duplicating steps the negative film original is used to produce a positive print film. The spectral densities of the print film dyes represent a positive image of the original scene and are designed for direct viewing through use of a motion picture projector.

Motion picture print film has been traditionally preferred for telecine scanning because positive prints, besides being readily available, are already color balanced for direct viewing and require fewer color corrections than a negative film. However, the making of a positive film print from the original negative film requires at least one extra processing step, which results in some degradation of the image as well as color saturation of the resulting print relative to the negative. A negative film in a telecine scanner can handle the tone scale from highlights to shadows with less distortion than print film, thus resulting in better color reproduction. All things being considered, therefore, it is desirable to be able to use both positive and negative films in a telecine scanner without undue inconvenience.

Ideally, a telecine scanner should measure the optical modulation caused by each dye in order to correctly estimate the red, green, and blue content of the original scene and produce a subjectively pleasing image. These measurements are difficult to obtain because the yellow, magenta, and cyan dyes used in film not only absorb light in the desired blue, green, and red bands of the spectrum, respectively, but each also absorbs in more than just the desired band. To eliminate the effects of the unwanted dye absorptions in the film and to improve color/tone scale quality, the ideal solution would be to have monochromatic telecine sensitivities at the three wavelengths corresponding to the peak absorptions of the three dyes. However, the narrower the spectral response of each color channel, the lesser the system efficiency or sensitivity. In order to waste as little as possible of the available light, dichroic beam-splitters and trimming filters are usually used to divide the light into three bands with slight overlaps in the 490 nm and 580 nm regions. (See "Color Bars on Film for Setting Up Telecines," by R. W. G. Hunt, *SMPTE Journal*, February, 1978, vol. 87, pgs. 78–81). Nonetheless, wide spectral responses result in the aforementioned color crosstalk (e.g., by measuring magenta dye in the cyan measurement channel), and further result in a system gamma that is at least to some extent a function of density, rather than color. Telecine spectral sensitivity, thus, is necessarily a compromise between sensitivity and color/tone scale quality.

U.S. Pat. No. 3,944,739 discloses a flying spot television scanner that operates in the aforementioned way with beam splitters and trimming filters to separate light from a scanned film into red, green, and blue components centered on predetermined wavelengths prescribed by standards accepted for color television. The components are obtained by a red reflecting dichroic mirror arranged to reflect red light through a red filter to a photosensor, and to transmit blue and green light. The transmitted blue portion is reflected by a second dichroic mirror through the series combination of a low pass blue filter and a high pass blue filter to another photosensor. The green light portion is transmitted through the second dichroic mirror and a green filter to a third photosensor. The combination of the dichroic mirrors and the light filters resolve and shape the light transmitted through the film into three components which are respectively red, blue and green.

Conventional telecine scanners have a fixed set of sensitivity peaks that generally correspond to a particular scanning standard or dye set. Despite such singular focus upon a particular standard or motion picture film, unwanted absorptions caused by overlapping spectral densities of the dye set are always present and may be further accentuated if for any reason the scanner sensitivity peaks do not coincide with the peak spectral absorption of the dyes. A matrix circuit is used to process the electrical scanning signals to enable corrections to be made for the effect of such unwanted absorptions and spectral misalignments. If different films, however, are run through the telecine scanner, the different dye sets are analyzed in different ways, and the telecine matrix settings may have to be adjusted. In many cases, the greater spectral misalignments require even more matrixing. Color matrixing, however, has the disadvantage of increasing noise in the resulting output and should be minimized for systems requiring high signal-to-noise performance.

SUMMARY OF THE INVENTION

Instead of handling different films with different dye sets as an afterthought in the color correction process, this invention proposes an entirely new set of scanner sensitivities for each film material. In the claimed telecine scanning apparatus, a motion picture film is interposed in a light path between a light source and a pickup stage that develops a plurality of separate color output signals. Color filter means, included in the pickup stage, separate the light into spectral regions that are broad enough to include the spectral dye sensitivities of different film materials. Selected sets of scanner sensitivities are provided by shaping filter means interposed in the light path between the light source and the pickup stage for conforming at least one of the spectral regions to the peak spectral sensitivity of a corresponding film dye of a particular film material.

BRIEF DESCRIPTION OF THE DRAWINGS

The invention will be described in relation to the drawings, in which.

DESCRIPTION OF THE PREFERRED EMBODIMENT

Figure 1A:
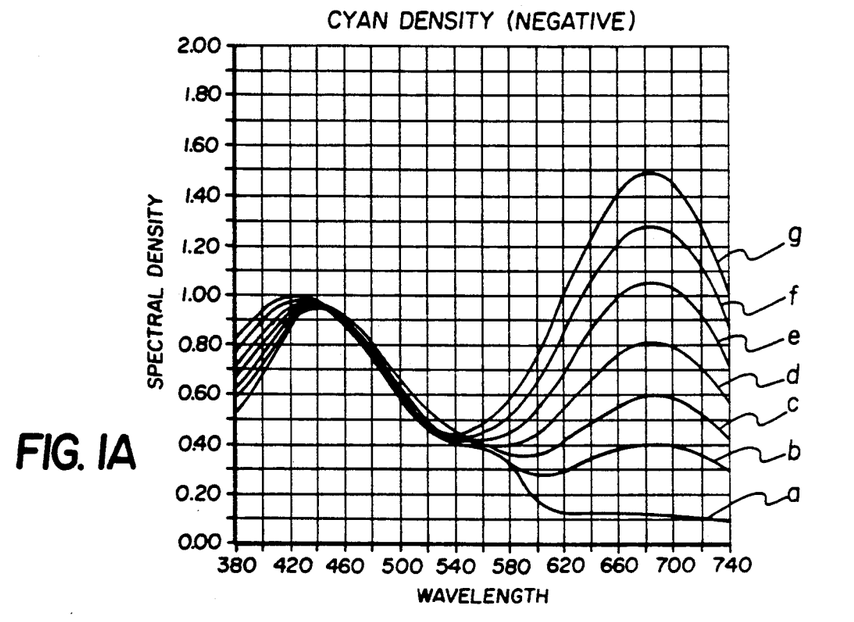
FIGS. 1A, 1B, and 1C show the spectral densities of the cyan, magenta, and yellow dye layers, respectively, of a negative material for a series of exposures.
Figure 1B:
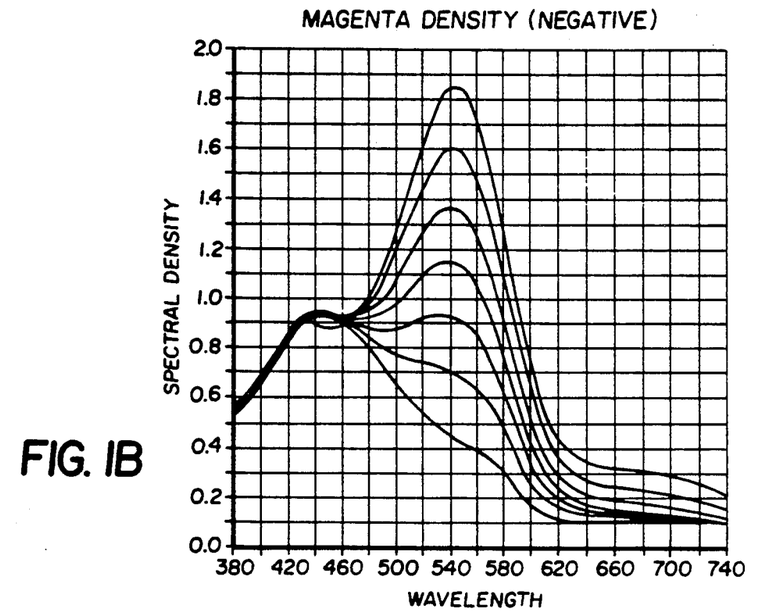
Figure 1C:
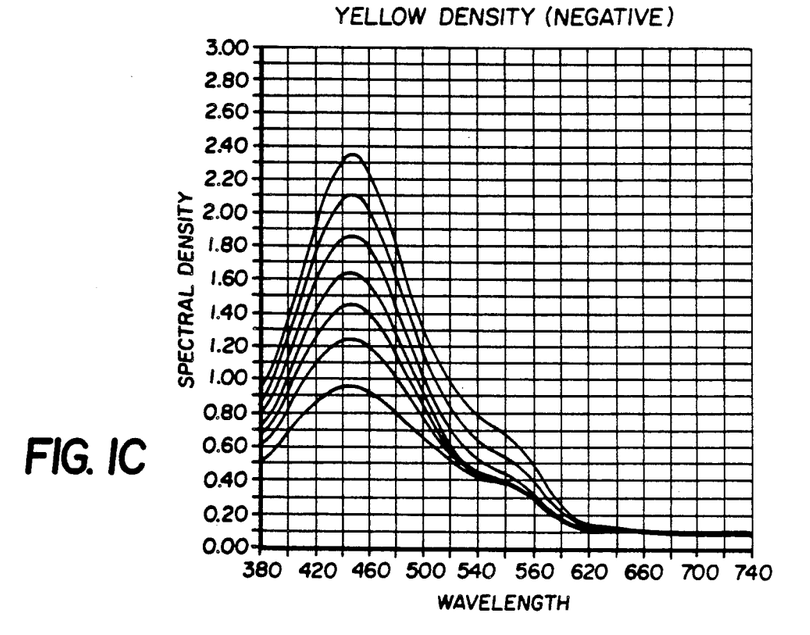
Figure 2A:
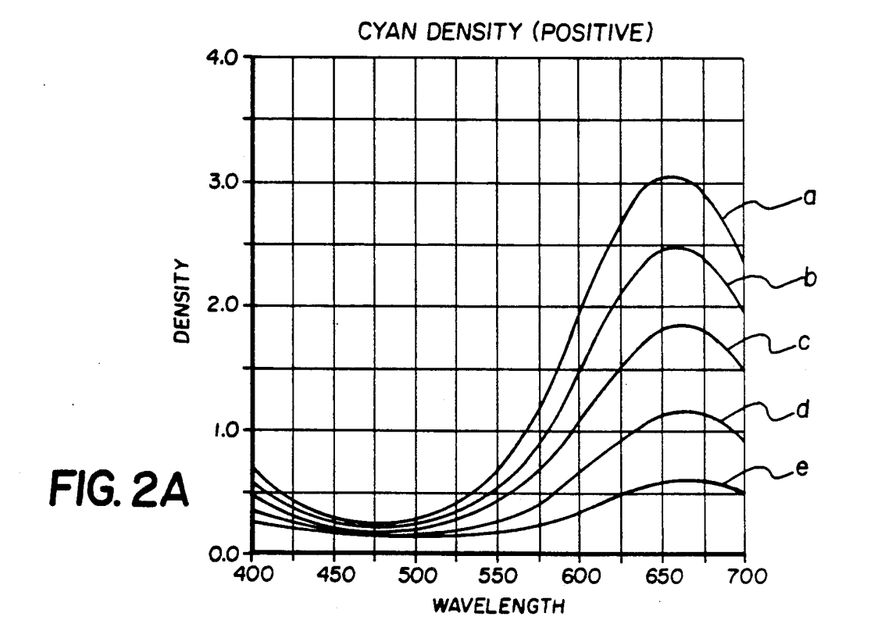
FIGS. 2A, 2B, and 2C show the spectral densities of the cyan, magenta, and yellow dye layers, respectively, of a print material for a series of exposures.
Figure 2B:
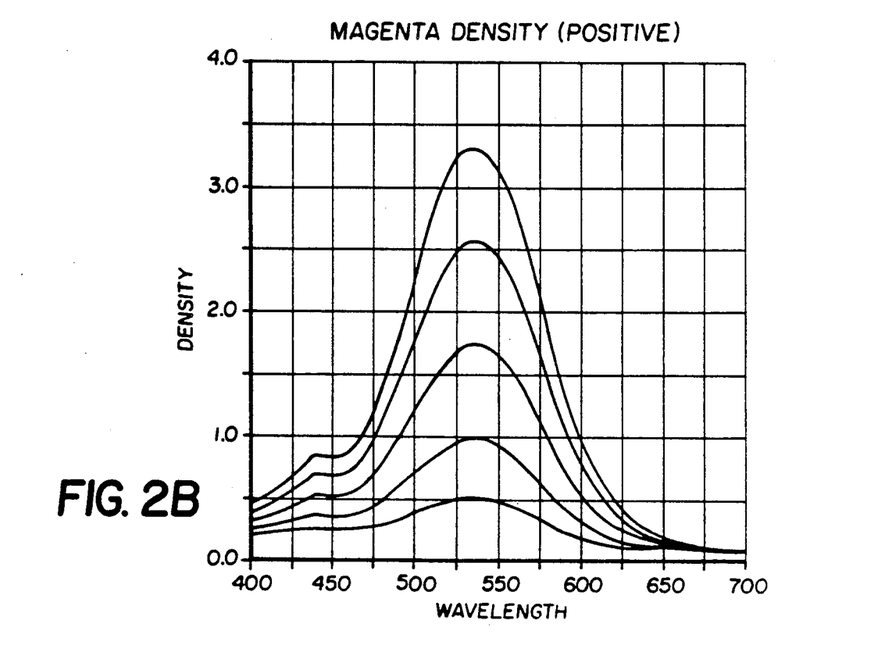
Figure 2C:
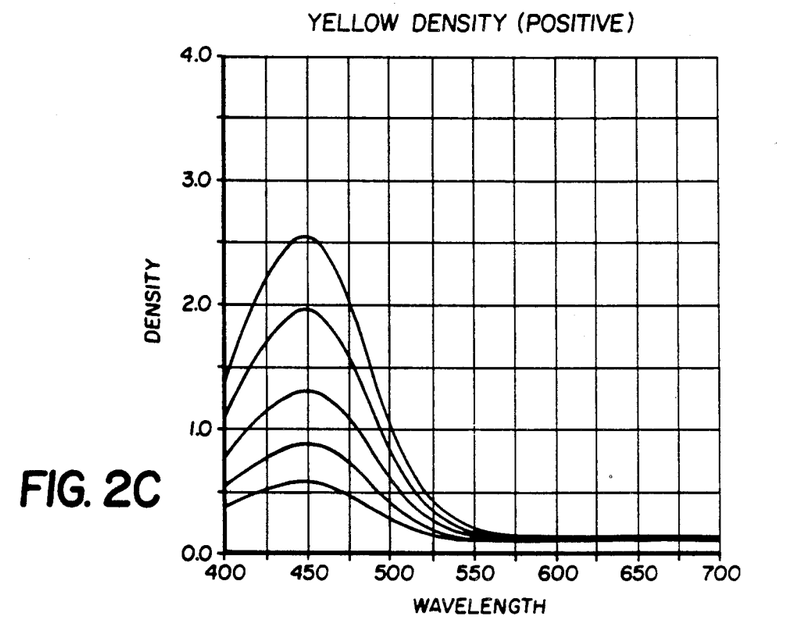

Referring initially to FIGS. 1 and 2, the spectral densities of the cyan, magenta, and yellow dyes are shown for negative and positive film, respectively, for a series of exposures. Negative exposures ranging from the lowest exposure "a" (D-min) to the highest exposure "g" produce the respective dye densities shown in FIGS. 1A, 1B, and 1C while print (positive) exposures ranging from the lowest exposure "a" to the highest exposure "e" produce the respective dye densities shown in FIGS. 2A, 2B, and 2C. As is well known, the amounts of cyan, magenta, and yellow dye modulate the amount of red, green, and blue light, respectively, transmitting through the film material. Several problems, which were described earlier, are further suggested from these graphs. Wide spectral response in a particular color channel, which is desirable for system efficiency and sensitivity, results in color crosstalk by measuring dye in other than the intended measurement channel. Particularly in the case of a negative dye, there are considerable unwanted dye absorptions that can offset the meaning of a wide spectral measurement. As shown in FIGS. 1A, 1B, and 1C, the density variations for wavelengths in between dye peaks of negative material is not modulated proportionately to the exposure. All of this suggests that the scanner peak spectral sensitivities should be concentrated at the film dye peaks in order to accurately measure dye density and thus correctly estimate the original scene exposure. Particularly for negative film, it is also necessary to block the wavelengths that do not bear information modulation.

From a comparison of FIGS. 1B and 1C with FIGS. 2B and 2C, it can be seen that the dye density peaks for the magenta and yellow dyes (i.e., the green- and the blue-modulating dyes) have similar peak positions, that is, near 545 nm (green) and 450 nm (blue). Comparing FIGS. 1A and 2A, however, shows that the dye density peaks for the cyan dye (i.e., the red-modulating dye) have different peak wavelength positions—about 690 nm for negative material and about 660 nm for print material. Consequently, the design for the telecine scanners illustrated in FIGS. 3 and 4 maintain a similar wavelength response in the blue and green regions and differ in the red region.

Figure 3:
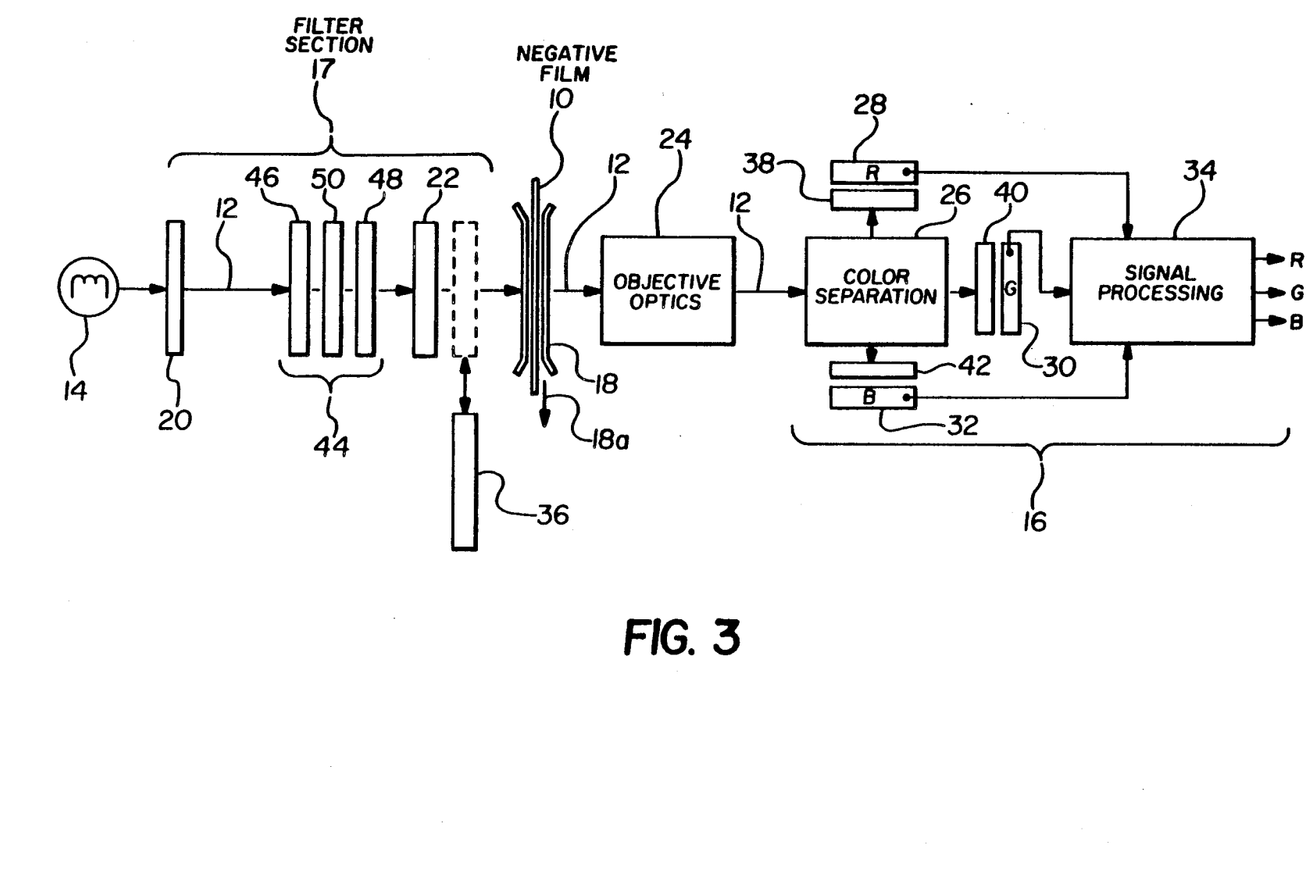
FIG. 3 shows elements of a telecine scanner utilizing color channel and shaping filters according to the invention for a negative material.
Figure 4:
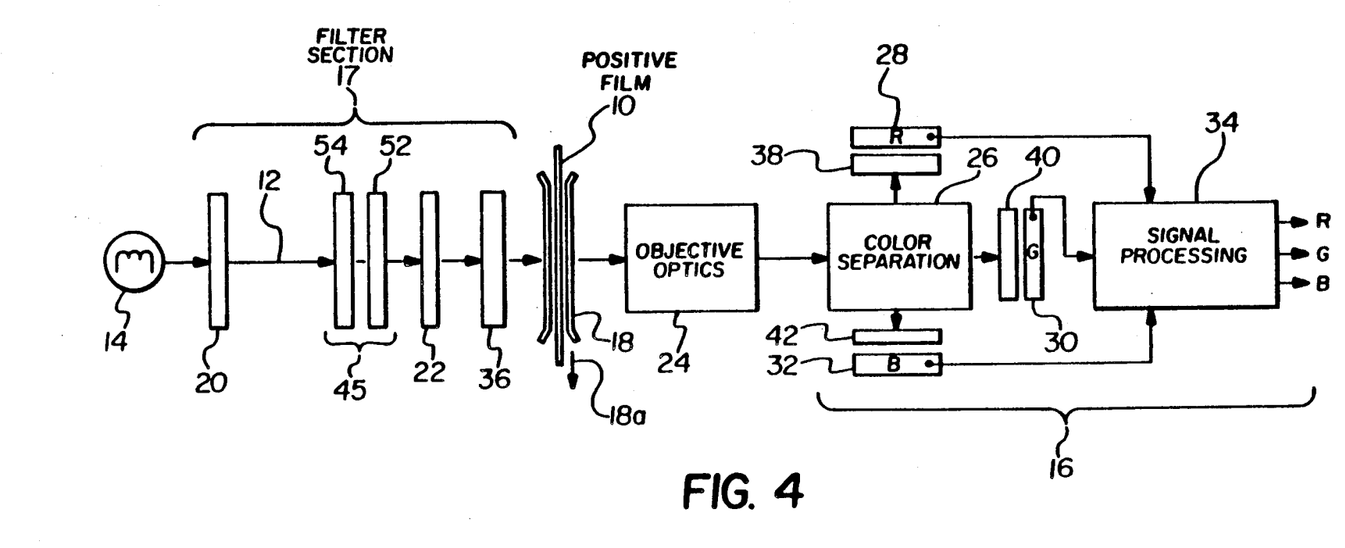
FIG. 4 shows elements of a telecine scanner utilizing color channel and shaping filters according to the invention for a print material.

Referring to FIGS. 3 and 4 together, the telecine scanner includes a motion picture film 10 interposed in an optical light path 12 between a light source 14 and a pickup stage 16. The film is constrained within a film gate 18 for movement as shown by an arrow 18A. Red, green, and blue color signals are generated by the pickup stage 16 in general correspondence to the red, green, and blue image content of the light exiting the film 10. The motion picture film 10 may be a negative film, as shown in FIG. 3, or a positive (print) film, as shown in FIG. 4.

Inasmuch as the base density of a negative motion picture film 10 is on the order of 0.3 units in red, 0.6 units in green, and 0.9 units in blue, it is helpful if the light source 14 produces a favorable ratio of blue to red (and green) energy. For example, a xenon continuous arc source is preferred in part because it produces more blue energy than an ordinary tungsten source. The light path 12 includes a filter section 17 in which some of the long wave infrared radiation is absorbed by a heat absorbing filter 20. Further, a source balance filter 22 "tunes" the output of the light source 14 and further helps to produce a light beam weighted toward blue, giving the light at this point a distinct cyan appearance. The remaining filters in the filter section 17 are described in subsequent parts of this description. The light beam exiting the filter section 17 is directed through an aperture (not shown) in the film gate 18 and is modulated by the amounts of cyan, yellow, and magenta dye in the film 10. The modulated beam is directed to the pickup section 16 by an objective optics section 24.

The pickup stage 16 includes a color separator 26, such as a beamsplitter incorporating dichroic mirrors, and a plurality of pickup devices 28, 30, and 32—one each for red, green, and blue light respectively. The pickup devices are conventional photosensitive elements, such as phototubes or charge-coupled devices. Charge-coupled devices (CCDs) are typically preferred for modern telecines because they require little maintenance and adjustment and have a long life. The output signals of the pickup devices are applied to respective gain-controlled amplifiers (not shown) in a signal processing stage 34, which produces the red, green, and blue output signals of the pickup stage 16.

During a calibration mode, a base density (D-min) filter 36 in the filter section 17 is inserted into the light path 12 between the light source 14 and the pickup section 16 (with the motion picture film 10 removed from the light path 12). This is shown schematically by the broken-line position of the filter 36 in FIG. 3. The filter 36 provides a color density substantially equivalent to the minimum base density of a negative motion picture film, that is, a density substantially equivalent to the mask density plus the residual minimum density of the negative material due to fog and the structure of the materials. With the filter 36 in the light path 12, the telecine scanner is adjusted so that the output signals R, G, and B from the pickup stage 16 are of equal amplitude. Further details of the use of the filter 36 are disclosed in commonly assigned, copending U.S. patent application Ser. No. 406,407, filed on Sept. 12, 1989, and entitled "Motion Picture Telecine Balanced for Negative Scanning". Moreover, as explained in Ser. No. 406,407 and as shown in FIG. 4 of the present application, the filter 36 remains in the light path 12 during motion picture print scanning in order to provide balanced operation.

If the pickup devices 28, 30, and 32 are charge-coupled devices, it is preferable to produce a full well condition, or a substantially full well condition, with the base density filter 36 in the light path 12. This insures maximum signal-to-noise performance for negative material. Full well operation, or a substantial proportion thereof, is provided by supplying sufficient light energy to the pickup stage 16. Providing sufficient intensity in the light source 14, particularly in spectral regions rendered deficient by the negative mask density (i.e., blue), and providing appropriate "trim" with the source balance filter 22, generates sufficient light energy for substantially full well operation. For these reasons, the earlier-mentioned xenon light source is the preferred source. The slight imbalance in R, G, B output levels from the preamplifier section (not shown) of the signal processing stage 34 is then corrected by relatively small gain adjustments.

The invention provides apparatus and means for conforming the sensitivity of the telecine scanner, and particularly of the pickup devices 28, 30, and 32, to the spectral dye densities of different film materials. As earlier emphasized, it is highly beneficial if the pickup devices 28, 30 and 32 are capable of evaluating dye density at the respective spectral peaks of the different materials. As explained in connection with FIGS. 1 and 2, this means in practice that different red spectral sensitivities must be provided, although it is within the teaching of the invention to customize any of the spectral regions for different materials.

Figure 5:
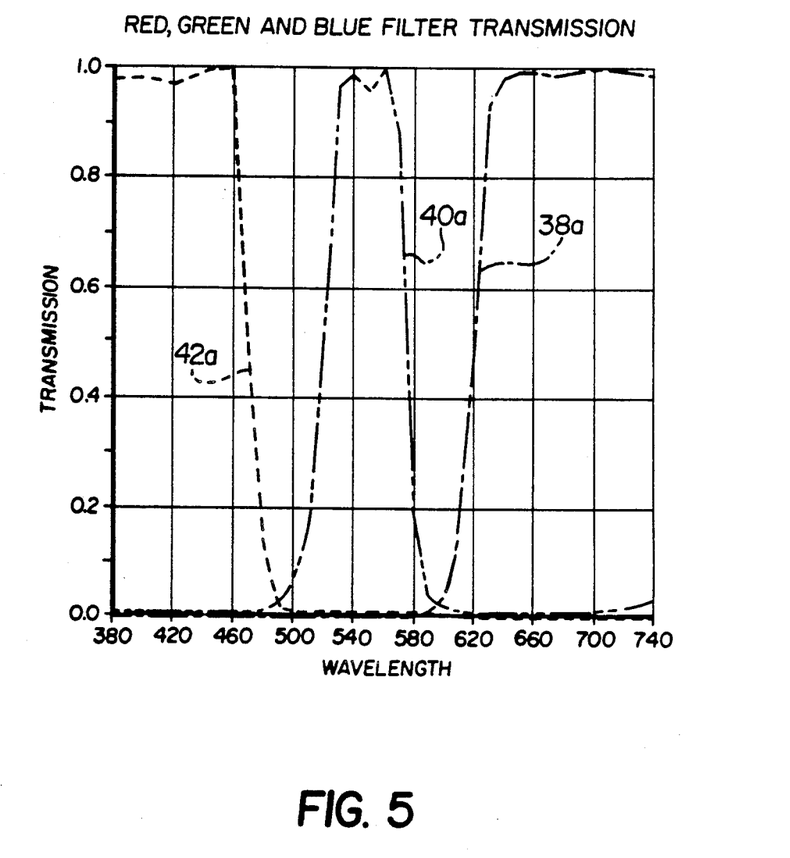
FIG. 5 shows the red, green, and blue transmission characteristics of the color channel filters shown in FIGS. 3 and 4.

The shaping of the spectral sensitivities is accomplished in two separate parts of the telecine scanner, as follows. Red, green, and blue channel filters 38, 40, and 42 are provided in the light paths between the color separator 26 and the respective red, green, and blue pickups 28, 30, and 32 for separating the light into spectral regions. The bandwidths of the channel filters 38, 40, and 42 are broad enough to include the spectral dye densities of different film materials, that is, specifically in the case of a telecine scanner, a negative motion picture film and a positive (print) motion picture film. More particularly, the channel filters 38, 40, and 42 are dichroic filters having spectral bandwidths in the respective colors for the film type having the limiting wavelength requirement, i.e., filters that provide the longest wavelength cut off for blue, the broadest green bandpass, and the shortest wavelength cut off for red. These conditions generally correspond to a print material. Representative transmission curves 38a, 40a, and 42a are shown in FIG. 5 for the channel filters 38, 40, and 42, showing a rather narrow peak sensitivity for the green filter 40 and relatively broader peak sensitivities for the red and blue channel filters 38 and 42.

The second aspect of spectral shaping, i.e., the further shaping of the spectral regions for a particular film material, is accomplished in a second part of the telecine scanner by respective sets 44 and 45 of shaping filters, one each for negative scanning and positive scanning. The filter sets 44 and 45 are situated in the light path 12 prior to the color separator 26 in the filter section 17 between the light source 14 and the film 10. The filter sets 44 and 45 conform at least one of the spectral regions to the peak spectral sensitivity of a corresponding film dye of a particular film material.

Figure 6A:
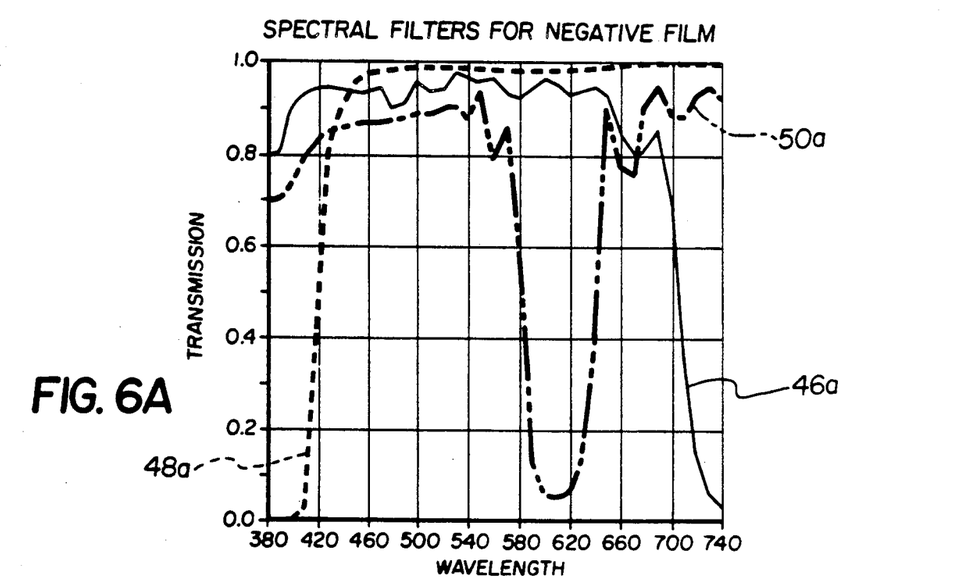
FIGS. 6A and 6B show the transmission characteristics of the shaping filter sets used in FIGS. 3 and 4 for negative and print materials, respectively.
Figure 7A:
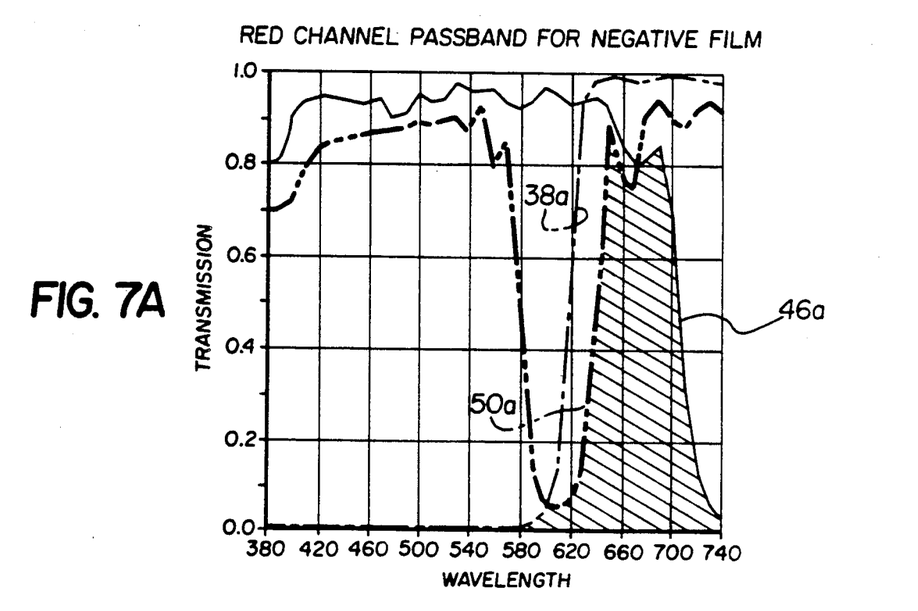
FIGS. 7A and 7B show the red channel passband for negative and print materials, respectively.

Considering first a telecine scanner set up for negative motion picture film, as shown in FIG. 3, the shaping filter set 44 includes an infrared (IR) cut filter 46, an ultra-violet (UV) cut filter 48, and a red-green (RG) notch filter 50. These filters have, respectively, the transmission characteristics 46a, 48a, and 50a, as shown in FIG. 6A, which would be typically provided by a conventional dichroic arrangement for the IR cut filter 46 and the RG notch filter 50 and a conventional glass absorbing filter for the UV cut filter 48. The color filtering provided by the shaping filter set 44 for negative scanning, when combined with the color filtering provided by the channel filters 38, 40, and 42, shape the low-band edge for blue sensitivity and to a lesser extent, the high band edge for green sensitivity. Both band edges for red sensitivity are defined by the combination of the RG notch filter 50 and the IR cut filter 46. The effect in the red channel passband is shown by FIG. 7A, which is to establish peak red sensitivity near the 690 nm peak cyan dye density shown in FIG. 1A. The cross-hatched area in FIG. 7A shows the resulting red sensitivity for negative scanning.

Figure 6B:
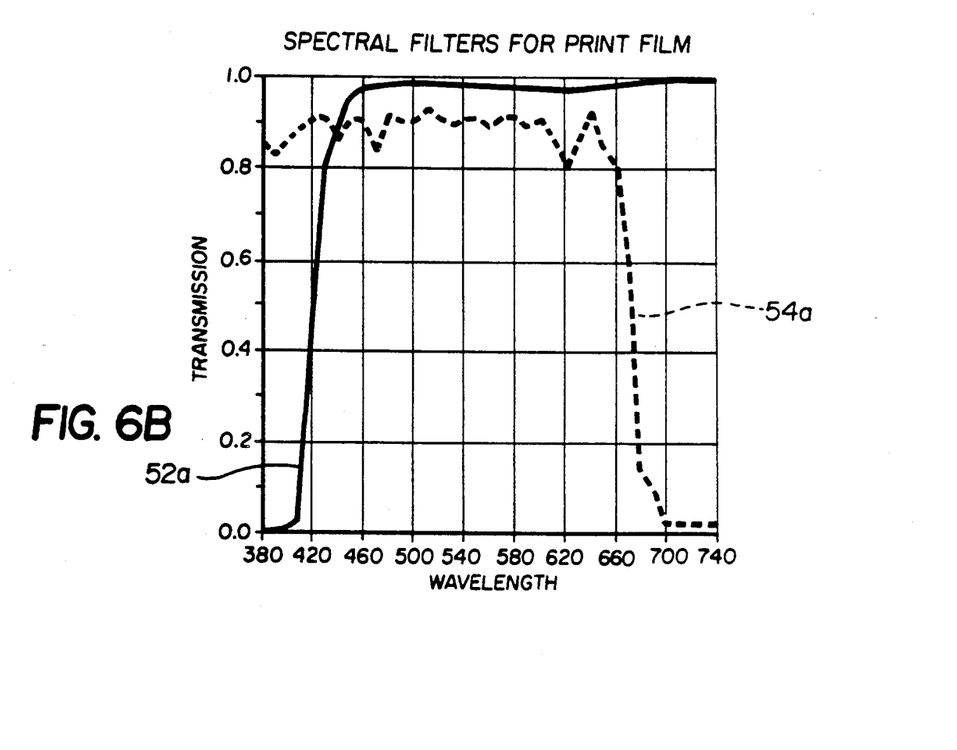
Figure 7B:
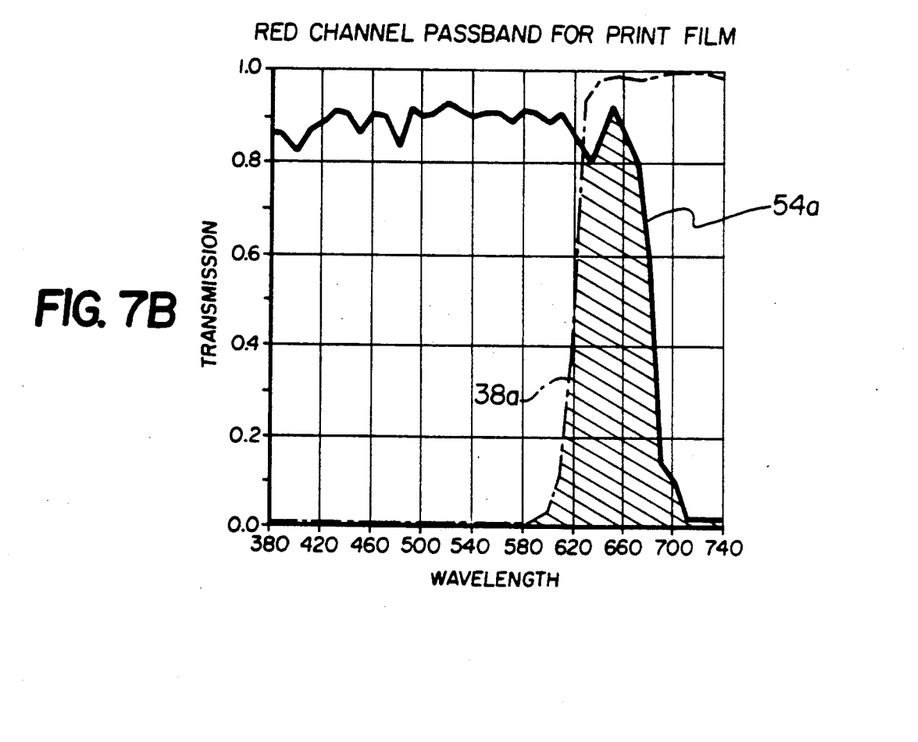

For print scanning, the main objective is to shift red sensitivity downward toward the 660 nm cyan dye density peak shown in FIG. 2A. The print shaping filter set 45 used for print scanning, as shown in FIG. 4, includes an ultra-violet (UV) cut filter 52 and an infrared (IR) cut filter 54. As shown in FIG. 6B (compared to FIG. 6A), the lower band edge of the transmission characteristic 54a of the IR cut filter 54 for print film is lower than the lower band edge of the IR cut filter 46 for negative film, while the transmission characteristic 52a of the UV cut filter 52 is substantially the same as for negative film. Such filtration would typically be provided by a dichroic arrangement for the IR cut filter 54 and a conventional glass absorbing filter for the UV cut filter 52. Consequently, the color filtering provided by the print shaping filter set 45, when combined with the color filtering provided by the color channel filters 38, 40, and 42, drives the passband of the red spectral region downward relative to negative scanning such that red sensitivity is centered more nearly on 660 nm. The cross-hatched area in FIG. 7B shows the resulting red sensitivity for print scanning.

The shaping filter sets 44 and 45 are preferably located in the filter section 17 between the light source 14 and the motion picture film 10 for reasons of mechanical access and to further reduce the IR radiation as soon as possible in the optical light path 12. The shaping filters, along with the heat absorbing filter 20, the source balance filter 22, and the base density filter 36, may, for example, be located in the lamp house assembly (not shown separately). Preferably, the heat absorbing filter 20 and the IR cut filters 46 or 54 are situated in the front of the filter section 17 closest to the light source 14 so as to reduce the IR heating effect on the remaining filters. Apart from access and IR reduction, however, the shaping filters can be located anywhere between the light source 14 and the pick up stage 16. It is usually advisable for the filter sets 44 and 45 to be located on the light-input side of the color separator 26 inasmuch as all three color channels can be equally affected by the band shaping. This is particularly important if the pickup stage 16 provides an additional output to a detail sensor, such as described in commonly assigned, co-pending U.S. Ser. No. 373,309, "Method and Apparatus for Generating a High Definition Electronic Signal from a Line Scan of a Color Original," filed June 29, 1989 in the names of Richard A. Sharman and Roger L. Lees. Having the shaping filter sets 44 and 45 on the input side of the color separator then determines the red, green and blue content of the detail channel as well as the color channels. It has also been found that the optical system of filters and lenses may provide sufficient filtration of ultra-violet light such that, in some cases, the UV cut filters 48 and 52 may be removed from the filter sets 44 and 45, respectively, without any detrimental effect.

Figure 8:
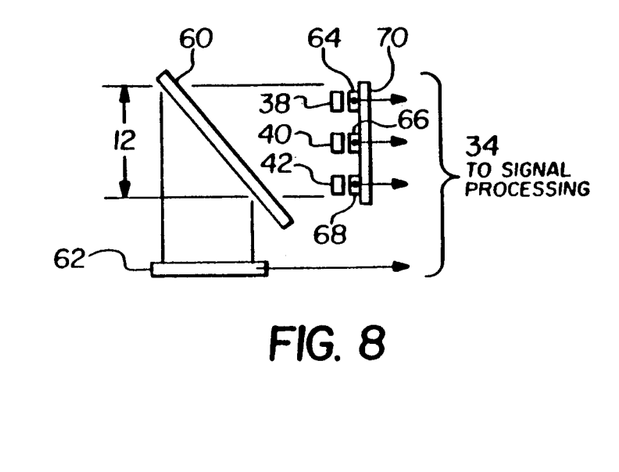
FIG. 8 shows a preferred color sensor embodiment and a further configuration for the color channel filters of either FIG. 3 or FIG. 4.

It is also of note that in U.S. Ser. No. 373,309 color sensing is obtained by three linear CCD arrays (one each for red, green, and blue) arranged side-by-side on a unitary structure. Color separation is provided by linear color filter strips overlying the arrays instead of a separate color separation block 26. Such a configuration, which is preferred for color sensing, is shown in FIG. 8, in which the light path 12 is separated by a dichroic mirror 60, one path leading to a detail sensor 62 and the other path leading to a set of linear arrays 64, 66, and 68 mounted on a common substrate 70. Spectral sensitization of the arrays 64, 66, and 68 is provided by the color channel filters 38, 40, and 42. Since the arrays 64, 66, and 68 are registered to different vertical locations on a film frame, the light directed thereto encompasses several lines of the image. One reason for preferring the configuration of FIG. 8 is that it provides greater flexibility in designing the spectral responses of the arrays 64, 66, and 68. In particular, the channel filters 38, 40, and 42 may have overlapping spectral bandwidths; then, for example, the blue sensitivity of the blue array may overlap the green sensitivity of the green array. On the other hand, with the color separator 26, such as a beamsplitter, of FIGS. 3 and 4 being used to separate the light, the light that is directed to (green) sensor 30 cannot significantly overlap light directed to (blue) sensor 32.

While the color channel filters 38, 40, and 42, and their filtering action, have been described separately from the color separator 26, it is quite feasible for the passbands of the color separator 26 to operate in conjunction with the passbands of the color channel filters 38, 40, and 42 to define the broad spectral bandwidths that include the spectral dye densities of different film materials. If, for example, the color separator 26 is a dichroic beamsplitter, the transmission and/or reflection characteristics of the dichroic mirrors contained therein can help to define either or both edges of the passbands. Indeed, in some systems, it is conceivable that the dichroic mirrors could by themselves define the broad spectral bandwidths and the color channel filters 38, 40 and 42 would be unnecessary. Alternatively, as in Ser. No. 373,309, the color channel filters 38, 40, and 42 act to separate the colors as well as to define the broad spectral passbands.

The invention has been described in detail with particular reference to a presently preferred embodiment, but it will be understood that variations and modifications can be effected within the spirit and scope of the invention.

What is claimed is:

1. Telecine scanning apparatus for processing color motion picture film in a scanner which interposes the film in a light path between a light source and a pickup stage that develops a plurality of separate color output signals from the light passing through the film, the film being a selected one of at least two different film materials having dye densities with different spectral characteristics, and the light source providing a common source of light energy having a spectral bandwidth that includes the spectral dye densities of the different film materials, the improvements wherein the scanner comprises:

color filter means included in the pickup stage for separating said light into spectral regions broad enough to include the spectral dye densities of said at least two different film materials; and shaping filter means interposed in the light path between the light source and the pickup stage for substantially conforming at least one of the spectral regions to the peak spectral density of the corresponding film dye of said selected film material, wherein said shaping filter means provides optical filtration specific for each film material.

2. Telecine scanning apparatus as claimed in claim 1 in which said shaping filter means further confines said at least one spectral region to a passband corresponding to the spectral dye density of said corresponding film dye.

3. Telecine scanning apparatus as claimed in claim 1 in which said color filter means includes a plurality of color channel filters for confining the light to separate colors occupying said separate spectral regions.

4. Telecine scanning apparatus as claimed in claim 1 in which said color filter means includes a beamsplitter for separating the light transmitting through the film into separate paths and a plurality of color filters operative in one or more of the paths for confining the light in said one or more paths to color passbands occupying said separate spectral regions.

5. Telecine scanning apparatus as claimed in claim 4 in which said beamsplitter separates the light into a detail path and a color path and said plurality of color filters are operative in said color path.

6. Telecine scanning apparatus as claimed in claim 4 in which said beamsplitter separates the light into a plurality of color paths and said plurality of color filters are respectively operative in said plurality of color paths.

7. Telecine scanning apparatus for processing color motion picture film in a scanner which interposes the film in a light path between a light source and a pickup stage that develops separate red, green, and blue output signals corresponding to the cyan, magenta, and yellow dye in the film, the film being a selected one of at least two different film materials having dye densities with different spectral characteristics in at least one of the cyan, magenta, or yellow dyes, and the light source providing a common source of light energy having a spectral bandwidth that includes the spectral densities of the different film materials, the improvement wherein the scanner comprises:

color channel filters included in the pickup stage, said color channel filters having red, green, and blue spectral passbands broad enough to include the spectral dye densities of said at least two different film materials;

shaping filter means interposed in the light path between the light source and the pickup stage for conforming the peak sensitivity of at least one of said red, green, and blue spectral passbands to the peak spectral density of at least one of said cyan, magenta, and yellow dyes of said selected film material, wherein said shaping filter means provides optical filtering for use with each film material.

8. Telecine scanning apparatus as claimed in claim 7 in which said shaping filter means further confines said at least one spectral passband to a passband substantially corresponding to the spectral density of said at least one dye of said particular film material.

9. Telecine scanning apparatus as claimed in claim 7 in which said pickup stage includes red, green, and blue light sensors and said red, green and blue color channel filters substantially overlie respective sensors.

10. Telecine scanning apparatus as claimed in claim 7 in which said pickup stage includes a color separator for separating the light passing through the film into red, green, and blue colors and said color channel filters operate in conjunction with the color separator to define said broad spectral passbands.

11. Telecine scanning apparatus for processing color motion picture negative or print film in a scanner which interposes the film in an optical light path between a light source and a pickup stage that directs the light passing through the film toward respective light sensors that generate red, green, and blue output signals corresponding to the amounts of cyan, magenta, and yellow dye in the film, said films having dye densities with different spectral characteristics in at least one of the cyan, magenta, or yellow dyes, and the light source providing a common source of light energy having a spectral bandwidth that includes the spectral densities of both films, the improvement wherein the scanner comprises:

red, green, and blue filters positioned in the path of said light directed to the respective light sensors for defining red, green, and blue spectral passbands broad enough to include the spectral dye densities of both negative and print film; and one or more shaping filters interposed in the light path between the light source and each of the films for selectively conforming the peak sensitivity of at least the red spectral passband to a spectral region substantially corresponding to the peak spectral density of the cyan dye of said selected negative or print film.

12. Telecine scanning apparatus as claimed in claim 11 in which said one or more shaping filters include an infrared cut filter which operates in conjunction with said red filter to conform the peak sensitivity of said red spectral passband to the peak spectral density of the cyan dye of a print film.

13. Telecine scanning apparatus as claimed in claim 11 in which said one or more shaping filters includes a notch filter having a transmission null between green and red and an infrared cut filter, said notch and cut filters operating together to conform the peak sensitivity of said red spectral passband to the peak spectral density of the cyan dye of a negative film.

14. Telecine scanning apparatus as claimed in claim 11 further including an additional light sensor for generating a detail signal and a beamsplitter for separating the light passing through the film into color and detail portions, said red, green, and blue filters being positioned in the path of the color portion.

* * * * *

UNITED STATES PATENT AND TRADEMARK OFFICE
CERTIFICATE OF CORRECTION

PATENT NO. : 5,003,379

DATED : March 26, 1991

INVENTOR(S) : Leslie G. Moore, Jr., et al

It is certified that error appears in the above-identified patent and that said Letters Patent is hereby corrected as shown below:

On the title page and Column 1, lines 1-4

Title "TELECINE SCANNING APPARATUS WITH SPECTRALLY -SHIFTED SENSITIVITIES RESPONSIVE TO NEGATIVE OR PRINT FILM DYES"

should read --TELECINE SCANNING APPARATUS WITH SPECTRALLY-SHIFTED SENSITIVITIES RESPONSIVE TO NEGATIVE OR POSITIVE FILM DYES--.

Signed and Sealed this

Twenty-ninth Day of December, 1992

*Attest:*

DOUGLAS B. COMER

*Attesting Officer*  Acting Commissioner of Patents and Trademarks